United States Patent [19]
Harbaugh

[11] Patent Number: 5,394,969
[45] Date of Patent: Mar. 7, 1995

[54] CAPACITANCE-BASED VERIFICATION DEVICE FOR A SECURITY THREAD EMBEDDED WITHIN CURRENCY PAPER

[75] Inventor: Steven K. Harbaugh, Castro Valley, Calif.

[73] Assignee: Authentication Technologies, Inc., Dublin, Calif.

[21] Appl. No.: 27,955

[22] Filed: Mar. 8, 1993

Related U.S. Application Data

[63] Continuation-in-part of Ser. No. 814,824, Dec. 31, 1991, Pat. No. 5,308,992.

[51] Int. Cl.⁶ .................. G07D 7/00; G01R 27/26
[52] U.S. Cl. ........................... 194/206; 324/672
[58] Field of Search ............. 194/206, 207; 324/672, 324/679

[56] References Cited

U.S. PATENT DOCUMENTS

| | | | |
|---|---|---|---|
| 3,980,990 | 9/1976 | Berube | 340/540 |
| 4,355,300 | 10/1982 | Weber | 340/146.3 C |
| 4,524,276 | 6/1985 | Ohtombe | 250/338 |
| 4,652,015 | 3/1987 | Crane | 283/91 |
| 4,761,205 | 8/1988 | Crane | 162/103 |
| 4,980,569 | 12/1990 | Crane et al. | 250/556 |
| 5,151,607 | 9/1992 | Crane et al. | 250/556 |

FOREIGN PATENT DOCUMENTS

| | | |
|---|---|---|
| 0133656 | 7/1984 | European Pat. Off. . |
| 0158079 | 2/1985 | European Pat. Off. . |
| 2211976 | 12/1989 | United Kingdom . |
| 8908898 | 9/1989 | WIPO . |

OTHER PUBLICATIONS

IBM ® Technical Disclosure Bulletin, vol. 28, No. 1, Jun. 1985.

*Primary Examiner*—F. J. Bartuska
*Attorney, Agent, or Firm*—Richard H. Kosakowski

[57] ABSTRACT

A verification device for a security thread embedded within currency paper includes a pair of capacitive plates having applied thereto time-varying electronic signals that are 180° out of phase. Disposed between the plates is a sensor element comprising a cylindrical wire dimensionally equal to the security thread. A guard electrode surrounds the sensor; the guard, sensor, and plates comprising a capacitance bridge. When the security thread in the currency is adjacent to the sensor and in proximity thereto, a capacitance imbalance occurs in the bridge. Electronic circuitry is responsive to this imbalance and provides an indication of a valid security thread embedded within the proffered currency paper.

10 Claims, 3 Drawing Sheets

U.S. Patent　　Mar. 7, 1995　　Sheet 1 of 3　　5,394,969
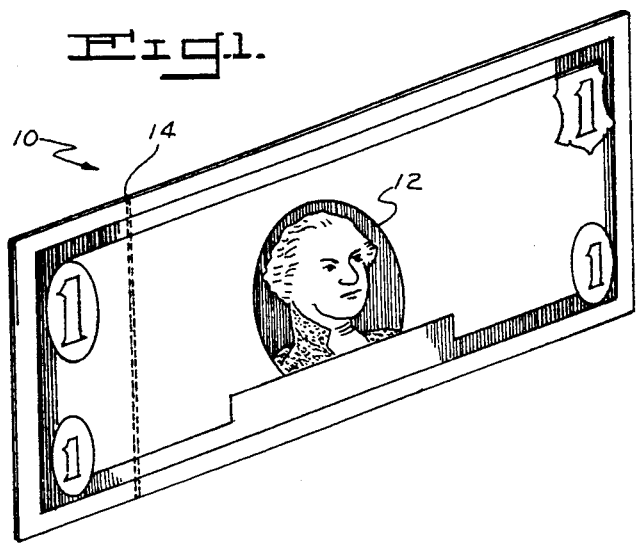
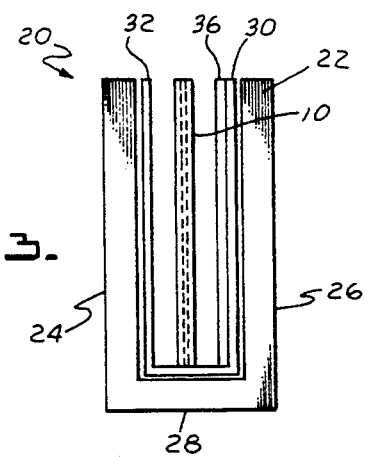
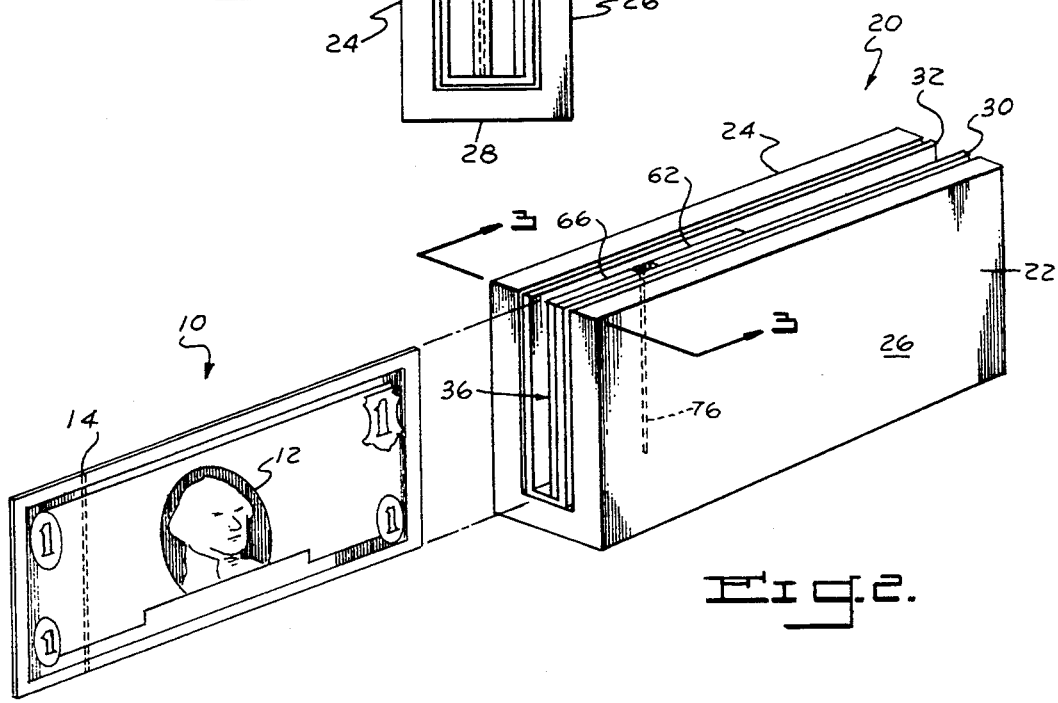

CAPACITANCE-BASED VERIFICATION DEVICE FOR A SECURITY THREAD EMBEDDED WITHIN CURRENCY PAPER

RELATED APPLICATION

This is a continuation-in-part of pending application Ser. No. 07/814,824, filed Dec. 31, 1991, now U.S. Pat. No. 5,308,992.

BACKGROUND OF THE INVENTION

This invention relates to currency paper security threads, and more particularly to a capacitance-based verification device for a security thread embedded within currency paper.

It is known in the art of currency and banknote papers to incorporate a security thread therein. The thread may comprise a plastic film having aluminum characters formed thereon. The thread is embedded within the currency and is not present on the currency surface. Such security threads are described in greater detail in Timothy Crane U.S. Pat. Nos. 4,652,015 and 4,761,205, both of which are assigned to Crane & Co., Inc.

The security thread described in these patents has printed characters thereon of extreme fine-line clarity and high opacity such that human readability of the printing is possible by means of transmitted light. Yet the printing remains completely indiscernible under reflected light. To check the authenticity of the thread, the currency is normally placed under an intense light source and the characters observed by the human eye. However, in commercial situations where such an intense light source is unavailable, thus making a human check for thread presence and authenticity virtually impossible, it is desirable to provide means for automatically determining the thread's presence and authenticity.

Various means are known for providing verification of the presence and authenticity of the security thread within the currency. For example, Crane et al. U.S. Pat. No. 4,980,569 ('569) discloses a verification device comprising two optical light source/detector pairs disposed on opposite sides of a proffered currency. The source and detector pairs are arranged for transmission and reception of optical energy through the currency if the thread is not present. Also, the source and detector pairs can determine the presence of a counterfeit thread on the currency surface by checking for light reflected off the currency surface. Thus, the '569 patent provides a two-fold test wherein the thread, to be genuine, must be detected under transmitted light and not be detected under reflected light. However, the device in the '569 patent may give a false indication of the authenticity of a counterfeit currency when a pencil line is drawn on the currency surface at the normal thread location.

In an attempt to overcome the shortcomings of the '569 patent, Crane et al. U.S. Pat. No. 5,151,607, discloses a verification device comprising the optical means of the '569 patent in combination with a magnetic detector, magnetic reader or non-ferrous-metal detector. The latter detectors determine the presence of the security thread, while the optical means determines whether the thread is properly within the currency or improperly disposed on either surface.

Accordingly, it is a primary object of the present invention to provide an improved security thread detector.

It is a general object to provide a detector that can determine the authenticity of currency at a rapid rate.

It is yet another object to provide a detector that can verify the presence of a security thread embedded within currency paper through use of a capacitance bridge.

The above and other objects and advantages of this invention will become more readily apparent when the following description is read in conjunction with the accompanying drawings.

SUMMARY OF THE INVENTION

According to the present invention, a verification device for a security thread embedded within currency paper includes a pair of capacitive plates having time-varying electronic signals applied thereto that are 180° out of phase with each other. Disposed between the plates is a sensor comprising a cylindrical wire dimensionally equal to the security thread. A guard electrode surrounds the sensor; the guard, sensor, and plates comprising a capacitance bridge. With no security thread proximate the bridge, the signals on the plates are equally coupled to the sensor and cancel each other. When a security thread is adjacent the sensor and in proximity thereto, a capacitance imbalance occurs in the bridge, causing the signals to be unequally coupled to the sensor. Electronic circuitry is responsive to this imbalance and provides an indication of a security thread embedded within the proffered currency paper.

The present invention has utility in the field of verification devices for security threads embedded in currency paper. Features of the invention include the capacitance bridge being insensitive to uniform materials (e.g., currency paper) that produce a balanced sensor capacitance. Also, the bridge sensor element has a physical configuration that may be matched to that of the thread for improved signal-to-noise ratio. The sensor element is tolerant of small variations in currency paper proximity. The conductive nature of the aluminum printing on the plastic security thread provides a bridge over the guard to increase the apparent thread capacitance and detector sensitivity. The sensor element output signal has a phase and amplitude signature that may discriminate valid threads from false indications.

BRIEF DESCRIPTION OF DRAWINGS

FIG. 1 is a perspective view of a United States currency paper having a metallized security thread embedded therein;

FIG. 2 is a perspective view of a security thread verification device for receiving the currency of FIG. 1;

FIG. 3 is an end view of the device of FIG. 2 with the currency of FIG. 1 inserted therein;

DETAILED DESCRIPTION OF THE PREFERRED EMBODIMENTS

Figure 4:
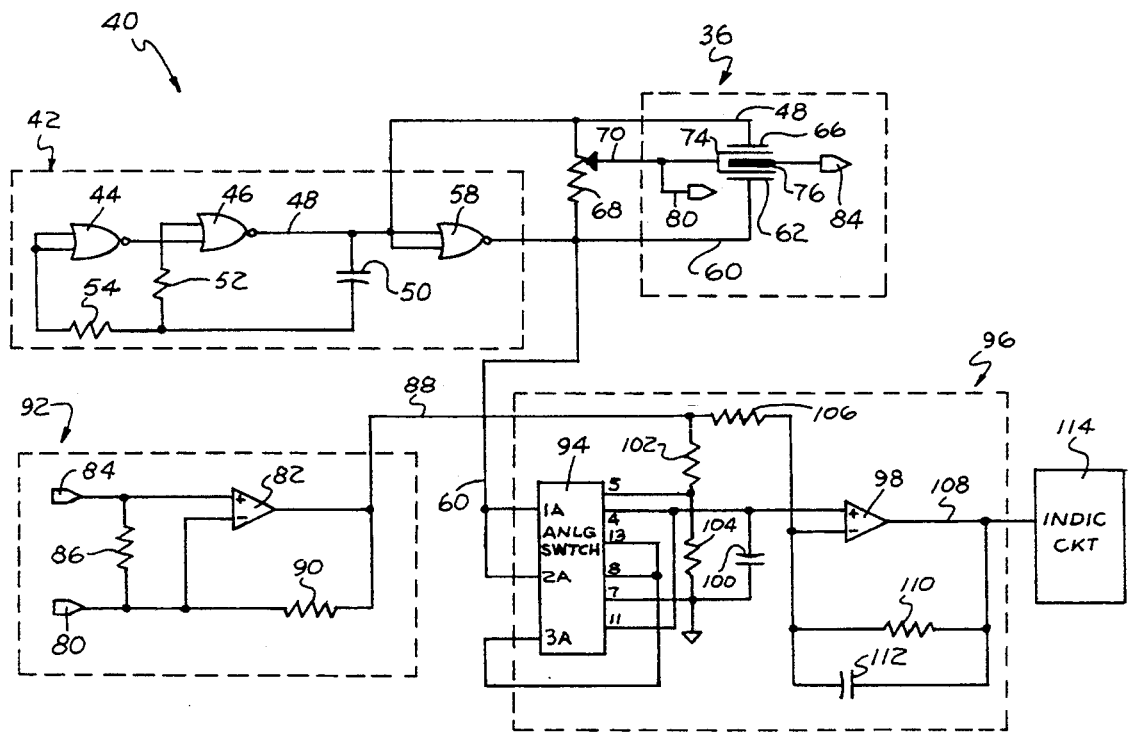
FIG. 4 is a schematic diagram of electronic circuitry included within the device of FIG. 2.

Referring to FIG. 1, there illustrated is an example of currency paper 10 of the United States. The currency 10 has a portrait 12 of a United States president printed thereon. The currency also includes a security thread 14 embedded therein, illustrated in phantom. The thread 14 may be of the type described in the aforementioned U.S. Pat. Nos. 4,652,015 and 4,761,205, hereby incorporated by reference. The thread extends from top to bottom and transversely across the linear extent of the currency. The thread comprises a plastic film having aluminum characters thereon indicative of, e.g., currency denomination. The thread is opaque to transmitted light, thus readily apparent when exposed to an intense light source. Yet the thread, being embedded within the currency paper and not on any surface, does not reflect light.

Referring to FIGS. 2 and 3, there illustrated in perspective is a security thread verification device 20. The device 20 is similar to that described and claimed in U.S. pending patent application Ser. No. 07/814,824 ("the '824 application"), filed Dec. 31, 1991 by Crane et al. The sole inventor of the present invention is a member of the inventive entity of the device of the '824 application.

The device 20 of the '824 application includes a U-shaped metal or plastic case 22 having two upstanding sidewalls 24, 26 joined by a bottom 28. One or more printed circuit ("PC") boards 30, 32, having electronic circuitry thereon, may be located within the case 22 and joined at the case bottom 28. The circuitry on the PC boards may be that illustrated in FIG. 4. Also, a capacitance bridge sensor 36 of the present invention may also be located proximate a PC board 30. The bridge 36 of the present invention is described in greater detail hereinafter with respect to FIG. 5 and is also described in conjunction with a hand-held package embodiment described in FIGS. 6 and 7.

The device 20 of the '824 application receives the currency 10 of FIG. 1 for verification of the presence of a security thread embedded within the currency. Verification commences by inserting the currency within the slotted opening formed by the PC boards 30, 32 and case 22. The case 22 is a currency receiver operable to receive an edge of a proffered currency 10. The currency is moved lengthwise within the slotted opening to insure the thread passes adjacent the sensor element within the bridge 36.

Referring to FIG. 4, there illustrated is a detailed schematic diagram of electronic circuitry 40 within the verification device 20 of the '824 application. The circuit 40 may be disposed on the PC boards 30, 32 of FIG. 2. Included is an oscillator 42 having a pair of two-input NOR gates 44, 46, each having its inputs connected together. The operation of a NOR gate in this manner is as an inverter. The first NOR gate 44 has its output fed to the inputs of the second NOR gate 46. The output of the second NOR gate 46 on a signal line 48 is fed back to its inputs through a capacitor 50 and resistor 52, and is fed back to the inputs of the first NOR gate 44 through a resistor 54.

The output of the second NOR gate 46 is fed on the line 48 to a third two-input NOR gate 58, having its inputs tied together. The output of the third NOR gate 58 is fed on a line 60 to a capacitive plate 62, which forms part of the capacitance bridge 36 of the present invention, described in more detail hereinafter in FIG. 5. The output of the second NOR gate 46 on the line 48 is fed to a second capacitive plate 66, which also forms part of the bridge 36. The two NOR gate outputs represent the two time-varying signal outputs, 180° out of phase, of the oscillator 42. A variable resistor 68 connects between the two oscillator outputs. An adjustable arm 70 of the variable resistor 68 connects to a guard electrode 74 that surrounds a sensor element 76. The capacitance bridge 36 thus comprises the two capacitive plates 62, 66, the sensor element 76, and the guard electrode 74.

The guard electrode 74 also connects on a signal line 80 to an inverting input of an operational amplifier ("op-amp") 82. The op-amp 82 may comprise the Model LM324, manufactured by Motorola of Phoenix, Ariz. The output of the sensor element 76 on a line 84 is fed to a non-inverting input of the op-amp 82. A resistor 86 connects across the two inputs of the op-amp. The op-amp is configured as a unity gain follower and provides a low impedance guard voltage that is the same as the sensor element signal voltage on the line 84. The output of the op-amp 82 on a line 88 is fed back to its inverting input through a resistor 90. The op-amp 82 and resistors 86, 90 form an amplifier circuit 92.

The output of the third NOR gate 58 on the line 60 is also fed to both the 1A and 2A inputs of an analog switch 94 that forms part of a synchronous detector circuit 96. The analog switch 94 may comprise the Model CD14007, manufactured by Motorola of Phoenix, Ariz. The 3A input of the switch connects to a pair of switch outputs, device pins 8 and 13. Another pair of switch outputs, device pins 4 and 11, connect to a non-inverting input of a second op-amp 98. The second op-amp 98 may also comprise the Model LM324. A capacitor 100 connects between the non-inverting input and ground. A fifth switch output, device pin 5, connects at the midpoint between a pair of resistors 102, 104. The other end of one resistor 104 connects to ground, while the other end of another resistor 102 connects to the output of the first op-amp 82 on the line 88. The output of the first op-amp also connects to an inverting input of the second op-amp through a resistor 106. A sixth switch output, device pin 7, connects to ground.

The output of the second op-amp 98 on the line 108 is fed back to its inverting input through a resistor 110 and capacitor 112 connected in parallel. The output of the second op-amp is also fed to an indicator circuit 114 that may provide visual indication, through use of well-known light emitting diodes ("LEDs"), of the presence or absence of a valid security thread within a proffered currency.

Figure 5:
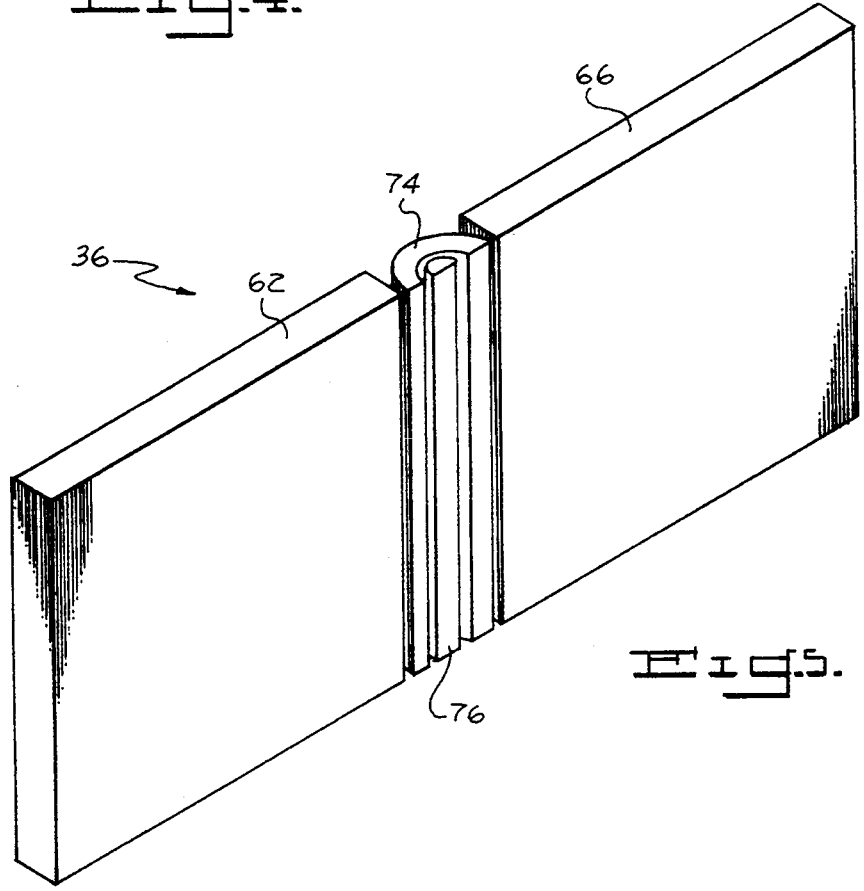
FIG. 5 is a perspective view of a capacitance bridge of the present invention utilized with the electronic circuitry of FIG. 4.

Referring to FIG. 5, there illustrated in perspective view is the capacitance bridge 36 of the present invention. The capacitive plates 62, 66 comprise the antenna signal transmitters of the oscillator 42. The sensor 76 disposed between the plates 62, 66 is a cylindrical wire having a diameter equal to the thickness of the security thread 14 and a length co-extensive with that of the thread. This configuration electrically matches the sensor to the security thread, thereby reducing the effects of the larger mass of the currency paper on the sensor. The sensor is surrounded by and spaced apart from the guard electrode 74 to further reduce the effects of the currency paper on the sensor. This bootstrap configuration reduces the stray capacitance both from the sensor 76 to ground and between the sensor 76 and plates 62, 66, thereby improving the sensor sensitivity.

Figure 6:
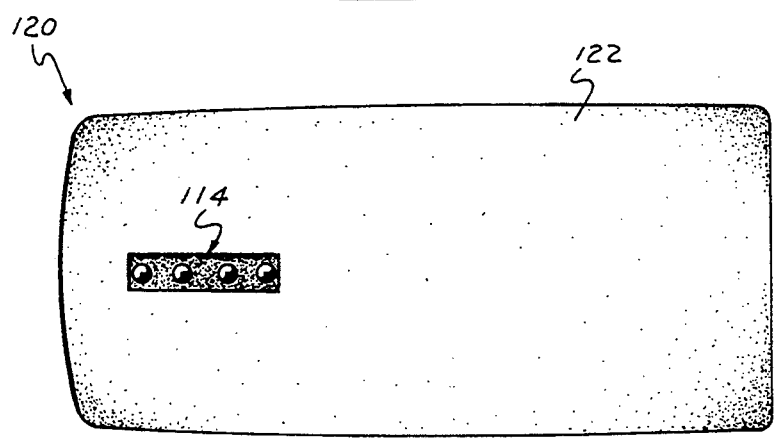
FIGS. 6 and 7 are front and back perspective views, respectively, of a hand-held security thread verification device including the capacitance bridge of FIG. 5 and the circuitry of FIG. 4.
Figure 7:
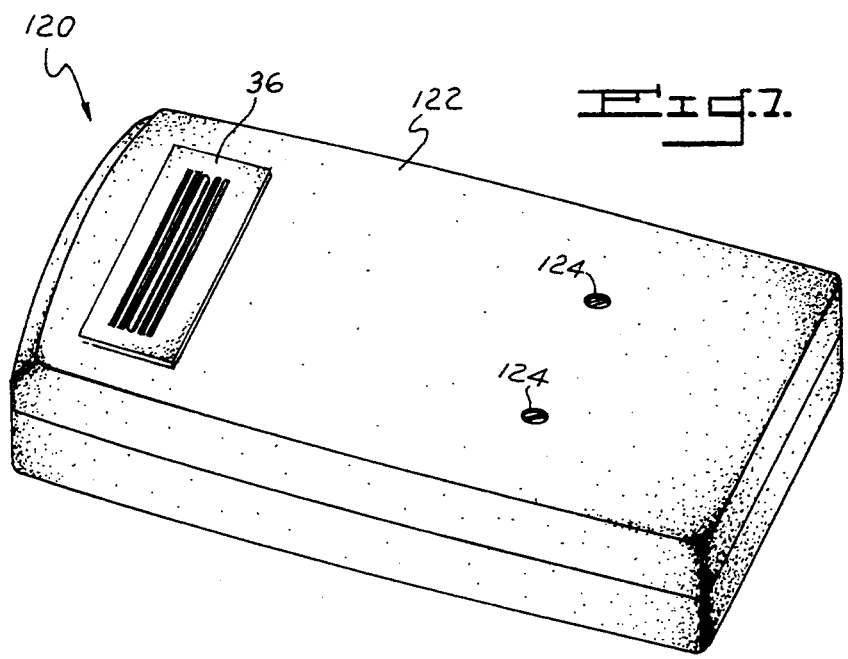

Referring to FIGS. 6 and 7, there illustrated in perspective are front and back views, respectively, of a hand-held security thread verification device 120 including the capacitance bridge 36 of the present invention. The device 120 comprises, e.g., a two-piece molded plastic housing 122 held together by screws 124. The circuitry of FIG. 4 resides on a printed circuit board (not shown) within the housing 122. A plurality of LEDs are visible from the front of the housing in FIG. 6. The LEDs are part of the indicator circuit 114 of the circuitry of FIG. 4. The capacitance bridge 36 of the present invention is mounted in an opening in the back of the housing 120.

The operation of the circuitry 40 of FIG. 4 and bridge 36 of FIG. 5 within the hand-held device 120 of FIGS. 6 and 7 is best understood by example. The oscillator 42 provides a pair of signals to the capacitive plates 62, 66 that are 180° out of phase and at a frequency of, e.g., 20 KHz. Due to the symmetrical configuration of the capacitance bridge 36, the signals on the plates are equally coupled to the sensor element 76 where they are canceled. In the absence of a security thread, the variable resistor 68 is adjusted to compensate for any imbalance between the sensor element and the plates, thereby achieving a null signal output (i.e., zero amplitude) on the line 84 from the sensor element 76. In this case, no LEDs will illuminate.

As the hand-held device 120 of FIGS. 6 and 7 is passed over the proffered currency 10 of FIG. 1 in proximity thereto, a security thread 14 within the currency 10 is disposed parallel to the sensor element 76 of the bridge 36. The proximity of the thread to the bridge creates a capacitance unbalance that produces an unequal coupling of the out-of-phase signals between the parallel plates 62, 66 and sensor 76. This results in a sensor signal on the line 84 whose phase and voltage level indicate the direction and magnitude, respectively, of the sensor unbalance. The synchronous detector 96 converts the 20 KHz sensor element output signal to a DC voltage at the output of the second op-amp 98. The DC voltage has a polarity indicative of phase and an amplitude proportional to the signal strength. The DC voltage may be used by the indicator circuit 114 to indicate the presence of a valid security thread by illuminating the LEDs of FIG. 6 in proportion to the amplitude of the DC voltage.

The capacitance bridge 36 of the present invention has been described as being embodied within a hand-held device 120 of FIGS. 6 and 7. The bridge has also been described and claimed in the aforementioned U.S. pending patent application Ser. No. 07/814,824 for use with a currency receiver arranged for accepting at least one edge of a proffered currency paper. It is to be understood, however, that the hand-held device and currency receiver embodiments are not part of the broadest scope of the present invention. The present invention, in its broadest form, relates solely to the capacitance bridge described hereinbefore, and not to how it is packaged. However, the Applicant envisions packaging embodiments of the capacitance bridge other than those described herein and in the '824 application, including, but not limited to, currency counting and sorting machines, automatic teller machines, vending machines, and the like. In these further applications, the currency will pass by the capacitance bridge automatically, not manually nor remain stationary. Such automatic passage is usually accomplished by means of a transport.

The circuit 40 of FIG. 4 has been described as comprising an oscillator circuit 42 made up of NOR gates. However, it is to be understood that such NOR gate configuration is purely exemplary.

Other known oscillator circuit configurations may be used without departing from the broadest scope of the present invention. It suffice that the oscillator circuit provide a pair of time-varying signals, 180 degrees out-of-phase, to the capacitive plates 62, 66. Further, the amplifier circuit 92 and synchronous detector circuit 96 of FIG. 4 are also exemplary. Other known embodiments of these circuits may be used in light of the teachings herein.

Further, the capacitance bridge 36 of the present invention has been described for use with a currency paper 10 having a security thread 14 embedded therein. However, the present invention is not limited to detecting threads in currency; the invention may be used to detect a thread present in other documents as well, such as stock certificates and bonds.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A device for verifying the authenticity of a document, an authentic document having a security thread embedded within the document paper and not present on any surface of the paper, the thread has selected metallized characters formed thereon, the thread is opaque to transmitted light yet the thread does not reflect light, the verification device comprising:

capacitive means, having a pair of plates disposed in spaced physical relation;

sensor means, disposed between the plates in a symmetrical physical orientation with the plates, for providing a sensor signal indicative of the presence or absence of the security thread from the proximate vicinity of the sensor means; and oscillator means, for providing a pair of time-varying signals of opposite phase to the capacitive means, a first one of the time-varying signals being connected with a first one of the plates, a second one of the time-varying signals being connected with a second one of the plates; where in the absence of the security thread from the proximate vicinity of the sensor means the pair of time-varying signals are coupled to the sensor means in an equal proportion such that the sensor signal provided by the sensor means has one or more characteristics indicative of the absence of the security thread from within the document; in the presence of the security thread in the proximate vicinity of the sensor means the time-varying signals are coupled to the sensor means in an unequal proportion such that the sensor signal provided by the sensor means has one or more characteristics indicative of the presence of the security thread within the document.

2. The verification device of claim 1, further comprising a signal processing means, for providing an indication of the absence or presence of the security thread within the document in response to the equal or unequal coupling proportions, respectively, of the time-varying signals to the sensor means.

3. The verification device of claim 2, wherein the one or more characteristics of the sensor signal indicative of the absence of the security thread from within the document includes a zero magnitude.

4. The verification device of claim 2, wherein the one or more characteristics of the sensor signal indicative of the presence of the security thread within the document includes an amount of phase and amplitude indicative of a direction and magnitude, respectively, of the unequal coupling proportion of the time-varying signals to the sensor means.

5. The verification device of claims 3 or 4, wherein the signal processing means comprises means for converting the sensor signal provided by the sensor means to a DC voltage value signal having a polarity indicative of the amount of phase of the sensor signal and having an amplitude proportional to the amplitude of the sensor signal.

6. The verification device of claim 5, wherein the signal processing means comprises means, responsive to the DC voltage value signal, for providing the indication of the absence or presence of the security thread within the document in response to the equal or unequal coupling proportions, respectively, of the time-varying signals to the sensor means.

7. The verification device of claim 3, further comprising null means, for providing the sensor signal with the zero magnitude characteristic in the absence of the security thread from the proximate vicinity of the sensor means.

8. The verification device of claim 7, wherein the null means comprises an adjustable resistor having a pair of ends connected between the time-varying signals and having an adjustable arm connected to the sensor means, the adjustable arm being adjusted to provide the sensor signal with the zero magnitude characteristic in the absence of the security thread from the proximate vicinity of the sensor means.

9. The verification device of claim 1, further comprising an electrically conductive guard sleeve disposed between the electrodes and the sensor means.

10. The verification device of claim 1, wherein the sensor means comprises an electrically conductive wire.

* * * * *